US012806113B2

(12) United States Patent
Caswell et al.

(10) Patent No.: US 12,806,113 B2
(45) Date of Patent: Nov. 24, 2026

(54) MULTI-DENSITY ADAPTABLE, CUSTOMIZABLE, AND INTERCHANGEABLE SEGMENTED MASSAGE ROLLER

(71) Applicants: Charles Caswell, Tulsa, OK (US); Richard Davis, Owasso, OK (US)

(72) Inventors: Charles Caswell, Tulsa, OK (US); Richard Davis, Owasso, OK (US)

( * ) Notice: Subject to any disclaimer, the term of this patent is extended or adjusted under 35 U.S.C. 154(b) by 506 days.

(21) Appl. No.: 18/370,385

(22) Filed: Sep. 19, 2023

(65) Prior Publication Data

US 2024/0091096 A1 Mar. 21, 2024

Related U.S. Application Data

(60) Provisional application No. 63/408,085, filed on Sep. 19, 2022.

(51) Int. Cl.
*A61H 15/00* (2006.01)

(52) U.S. Cl.
CPC ..... *A61H 15/00* (2013.01); *A61H 2015/0014* (2013.01); *A61H 2201/0107* (2013.01); *A61H 2201/0192* (2013.01); *A61H 2201/1657* (2013.01)

(58) Field of Classification Search
CPC ................ A61H 15/00; A61H 15/0092; A61H 2015/0014; A61H 2015/0021; A61H 2015/0035
See application file for complete search history.

(56) References Cited

U.S. PATENT DOCUMENTS

| | | | | | |
|---|---|---|---|---|---|
| 3,645,256 | A * | 2/1972 | Morrison | A61H 15/00 D21/684 |
| D843,001 | S * | 3/2019 | Davis | D24/211 |
| D886,315 | S * | 6/2020 | Hicken | D24/211 |
| 10,765,594 | B2 * | 9/2020 | Sanchez | A61H 15/0092 |
| 10,925,802 | B2 * | 2/2021 | Matossian | A61H 15/0092 |
| 11,471,369 | B2 * | 10/2022 | Nelson | A61H 15/00 |
| 2011/0313333 | A1 * | 12/2011 | Nicholson | A61H 15/0092 601/120 |
| 2015/0148721 | A1 * | 5/2015 | De Nitto | A61H 15/0092 601/118 |
| 2017/0189260 | A1 * | 7/2017 | Chen | A61H 15/0092 |
| 2018/0353370 | A1 * | 12/2018 | Liao | A61H 15/0085 |
| 2020/0093683 | A1 * | 3/2020 | Raines | A61H 1/00 |
| 2022/0023138 | A1 * | 1/2022 | Reeg | A61H 15/0092 |

* cited by examiner

*Primary Examiner* — Shaun R Hurley
(74) *Attorney, Agent, or Firm* — Sherwood & Robert; AJ D. Martinez

(57) ABSTRACT

A customizable massage roller adapts to a user's specific recovery needs. It features a central cylindrical core with internal structural supports and built-in alignment ribs running along its length. A user can slide multiple foam massage rings onto these ribs to create a personalized layout. Each foam ring has a unique density, surface pattern, and projection height. This allows users to arrange the rings in any combination to target everything from superficial tension to deep tissue knots. Two hollow retainer caps screw into the threaded ends of the core to lock the rings safely in place. Beyond relieving muscle and connective tissue pain, this versatile tool also functions as an apparatus for stretching, exercising, and core strengthening.

5 Claims, 19 Drawing Sheets

MULTI-DENSITY ADAPTABLE, CUSTOMIZABLE, AND INTERCHANGEABLE SEGMENTED MASSAGE ROLLER

BACKGROUND

The present invention relates generally to massage rollers, more particularly, the present disclosure is directed to a new and improved segmented massage roller that is designed to be adaptable to a user's specific massage needs. The new and improved segmented massage roller has multiple interchangeable massage rings that can be arranged in any order or configuration, each of which are comprised of a different density, massage pattern, and size/height of the massage pattern, thereby allowing users to customize the massage roller to their specific needs from superficial to deep tissue compression. These features allow the segmented massage roller to be particularly effective at relieving tender and painful conditions such as muscle or connective tissue conditions and can further be used as an exercise, stretching, and core strengthening apparatus.

Massage rollers are used for a variety of reasons, including in physical therapy and exercise, and are sold in a variety of lengths, diameters, densities, and colors. Massage rollers are often used to alleviate muscle tightness and tension, as well as for stretching, and as a core workout and strengthening apparatus. And while there may have been massage rollers that claim to allegedly have multiple densities within one roller, those rollers have always been comprised of the same foam material throughout, which of course is the same density throughout and therefore not a true multi-density massage roller. Further, prior art massage rollers come "as-is" with the massage pattern or configuration set and there being no option to adapt or configure the massage roller to a specific user's needs. Therefore, prior art massage rollers have been limited in their effectiveness, both therapeutically and as exercise devices, because they have lacked the ability to provide a single massage roller capable of providing an adaptable and customizable massage roller experience, with variable massage patterns with truly different densities that also provides other positive benefits for a user. The massage roller of the present invention delivers these positive benefits and a truly, unique massage roller experience.

Prior art massage rollers typically consist of a foam cylinder or foam-covered core of various sizes and lengths; typically, twelve or more inches in length and approximately six inches in diameter. Longer foam rollers typically up to thirty-six inches do exist, typically for rolling over specific muscles in the back. A variety of foam roller materials comprised of single densities have been used in individual rollers, but there have not been any prior art rollers that are truly capable of delivering a massage roller with variable massage patterns that also have multiple densities throughout an individual roller. Many types of foam rollers are currently in use; however, the surface types or massage patterns and the rigidity or density of such rollers are not easily adaptable, customizable, modifiable, or changeable to a user's specific needs. Therefore, it is often the case that several different types of massage rollers or massage roller devices must be available and used to achieve the outcome a user seeks. Currently available massage rollers are limited in massage surface patterns and densities, and as discussed, current rollers only offer one surface pattern and one density throughout said massage rollers.

Accordingly, there is a need for a new and improved massage roller that is easily adaptable, customizable, modifiable, and changeable to an individual user's needs by providing the user with multiple options in which to configure the massage roller so that it provides different characteristics and therefore different results based on the user's configuration simply by allowing the user to interchange various massage rings which consist of different characteristics, such as different densities, different massage patterns, and different heights of the massage pattern projections, all in an easy to use, efficient, yet safe and effective manner and which is particularly effective in providing various massage options and therefore relieving tender and painful discomfort associated with muscle and connective tissue tightness and tension, as well as providing an adaptable and comfortable option as an exercise, stretching, and core strengthening apparatus.

SUMMARY

The present invention is directed to a segmented massage roller that satisfies the foregoing needs. The segmented massage roller of the present invention provides a user with the ability to customize the massage roller based on the user's needs to provide a more effective and beneficial massage experience by providing a massage roller that the user can configure in a multitude of ways with interchangeable components that are comprised of different characteristics such as different densities, different massage patterns, and different heights of the massage pattern projections, all in an easy to use, efficient, safe and effective manner. The segmented massage roller of the present invention is particularly effective in providing various massage options resulting relief of pain and discomfort associated with muscle and connective tissue tightness and tension as well as providing multiple adaptable options as an exercise, stretching and core strengthening apparatus.

An illustrative embodiment of a multi-density adaptable, customizable, and interchangeable segmented massage roller of the present invention comprises a cylindrical roller core with interior structural supports, which may be referred to as fins or an X-core design (referred to as the UltraFin® core by Applicant; U.S. Pat. No. 6,644,676), running the length of the roller core, said roller core being internally threaded at each end, a plurality of ribs on an outside surface of the cylindrical roller core running from end to end of the core, a plurality of foam massage rings which include grooves to fit onto the plurality of ribs of the core, wherein each foam massage ring is comprised of a different density, a different massage pattern, and a different height of the massage pattern projections, and two externally threaded hollow retainer caps (can also be referred to as "end caps") with external threads to connect to and screw into the internal threads at the ends of the roller core. The plurality of foam massage rings are purposely comprised of different foam densities, different massage patterns, and different heights of the massage pattern projections, so that a user may customize the massage roller by interchanging or rearranging the foam massage rings in any combination that the user prefers to deliver the desired massage relief.

It is an object of the present invention to provide an improved foam massage roller that can be conveniently adapted and customized to an individual user's needs by providing a roller that can be reconfigured based on interchangeable components; components that have different massage characteristics.

Another similar object of the present invention is to provide a foam massage roller that is comprised of easily interchangeable parts and features that can be configured in a variety of ways to accommodate the specific needs of a wide range of users.

An important advantage of the present invention is that it provides a massage roller comprising adaptable, easily interchangeable massage rings that can be arranged to make up a customized massage relief surface of the massage roller, each massage ring, or groups of massage rings, having different massage characteristics to provide variable, nearly unlimited massage and therapeutic options by allowing the ability to arrange and customize the massage rings in limitless configurations and combinations. This ability to arrange in any combination or configuration includes merely rotating the massage rings around the core, by sliding the massage rings onto the ribs of the roller core, to create a different massage pattern, rearranging and/or putting different massage rings with difference characteristics on the core, or by doing a combination of both. There are numerous different configurations that a user can achieve with the current invention by using whatever massage rings they prefer, in whatever order, arrangement, or configuration they prefer. The options and therefore potential massage patterns are numerous as a user can choose to use all the same massage rings or any combination of the different massage rings and can arrange them in any order they prefer, including the order in which the massage rings are put on to the roller core as well as rotating the massage rings around the roller core.

Another important advantage of the present invention is that it provides for the use of different massage rings, each difference massage ring consists of different characteristics, such as different densities, different massage patterns, and different sizes of the massage pattern.

While it is to be understood that both the foregoing general description and the following detailed description are exemplary and explanatory only and are not restrictive on the present invention, these and other features, aspects, and advantages of the present invention will become better understood with regard to the following detailed description and accompanying drawings where:

DESCRIPTION

Figure 1:
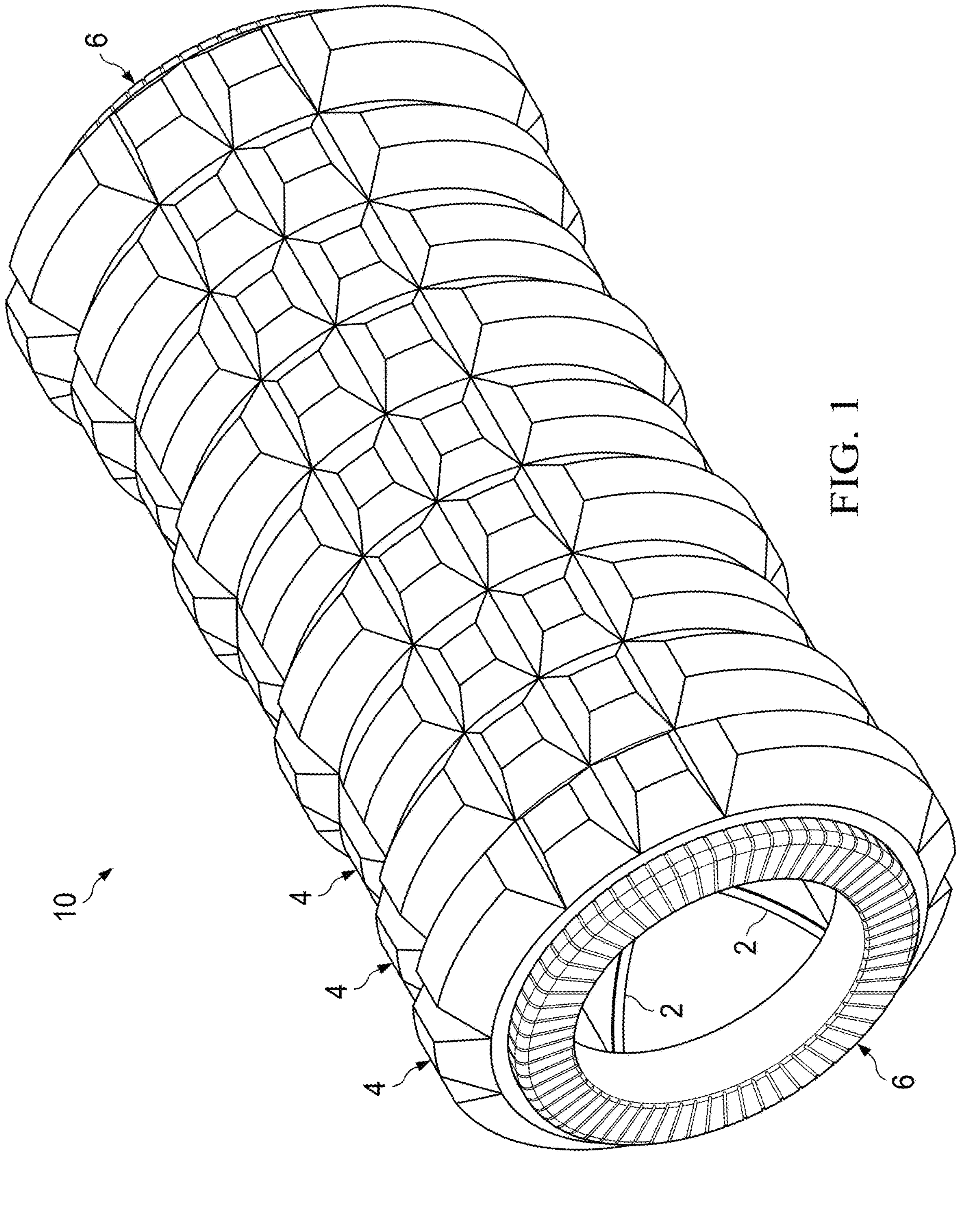
FIG. 1 is a perspective view of the segmented massage roller of the present invention showing an assembled embodiment.
Figure 2:
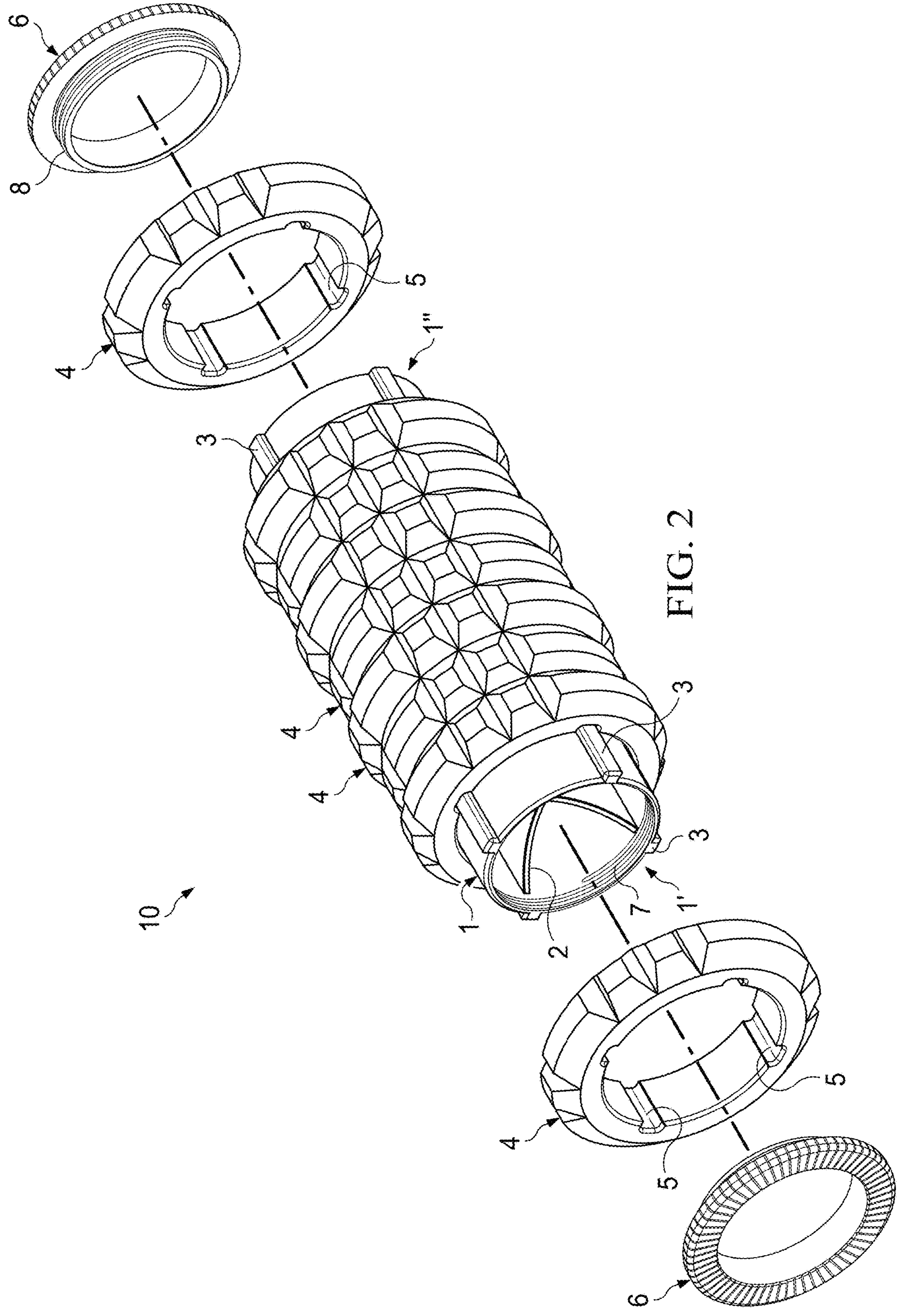
FIG. 2 is a perspective, exploded view of the segmented massage roller of the present invention showing the embodiment in FIG. 1.
Figure 3:
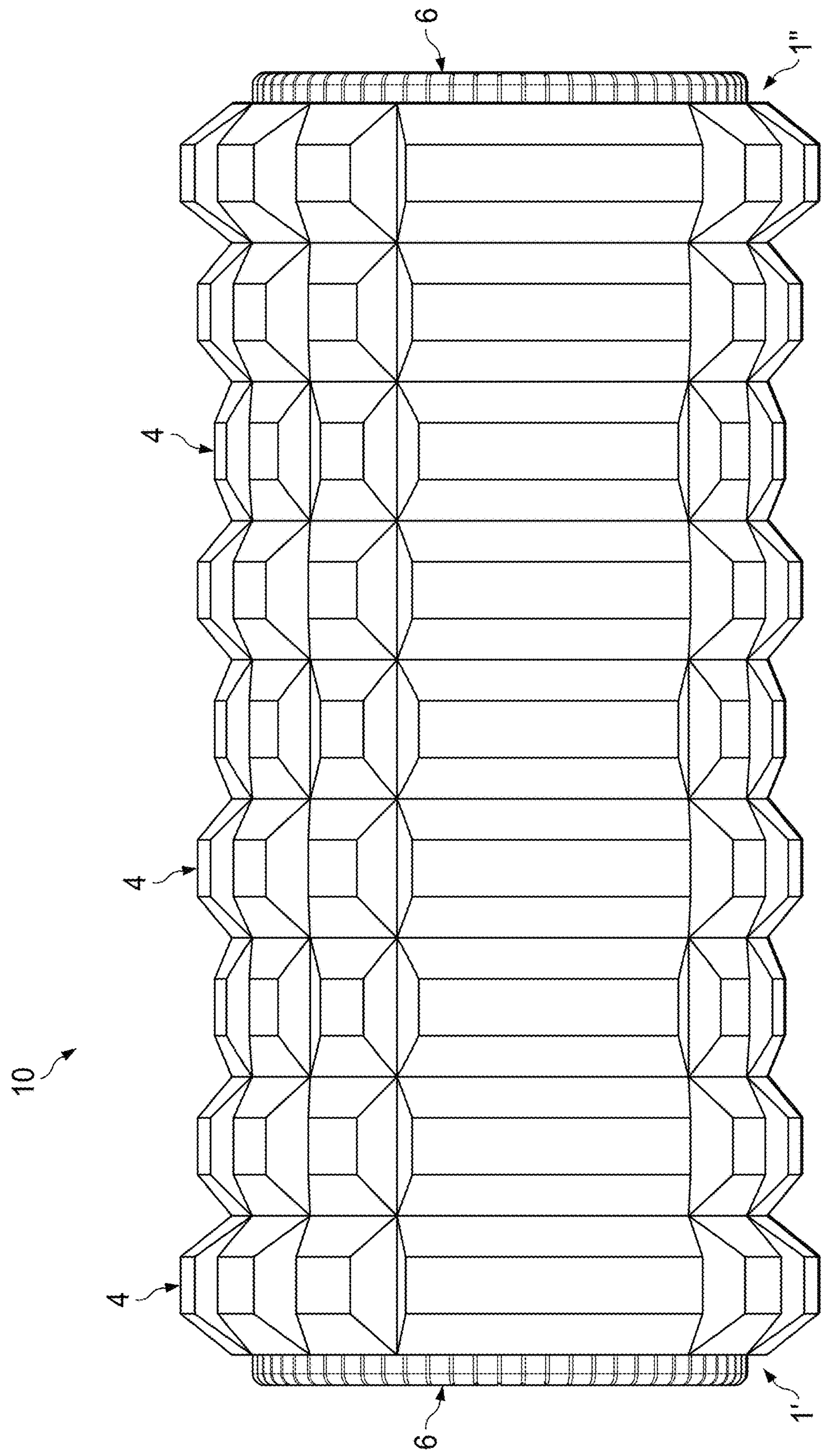
FIG. 3 is a side view of the segmented massage roller of the present invention showing the embodiment in FIG. 1.

Referring now to the drawings, reference will be made to preferred embodiments of the present invention, examples of which are illustrated in the accompanying drawings and not meant for purposes of limiting the scope of the present invention. With reference to FIGS. 1-3, an embodiment of a segmented massage roller 10 in accordance with the present invention is shown detailing the various components that make up the present invention. The segmented massage roller 10 comprises a cylindrical roller core 1, wherein said cylindrical roller core 1 has a first end 1' and a second end 1" and further comprises a plurality of interior structural supports 2 running longitudinally from the first end to the second end, creating a plurality of interior cavities, and a plurality of exterior ribs 3 running longitudinally from the first end to the second end of the cylindrical roller core 1. The segmented massage roller 10 further comprises a plurality of foam massage rings 4 that include a plurality of grooves (or channels) 5 on their interior which are adapted to slidably connect onto the ribs 3 of the core 1, and two externally threaded, hollow retainer caps 6 that are designed to mate to the first end 1' and second end 1" of the cylindrical roller core 1. Said first end 1' and second end 1" being internally threaded, where said internal threads 7 are designed to receive the external threads 8 of the two externally threaded hollow retainer caps 6. The foam massage rings 4 can also sometimes also be referred to as “adaptive massage rings” or “foam massage wheels” but all terms refer to the same component and mean the same thing.

Figure 7:
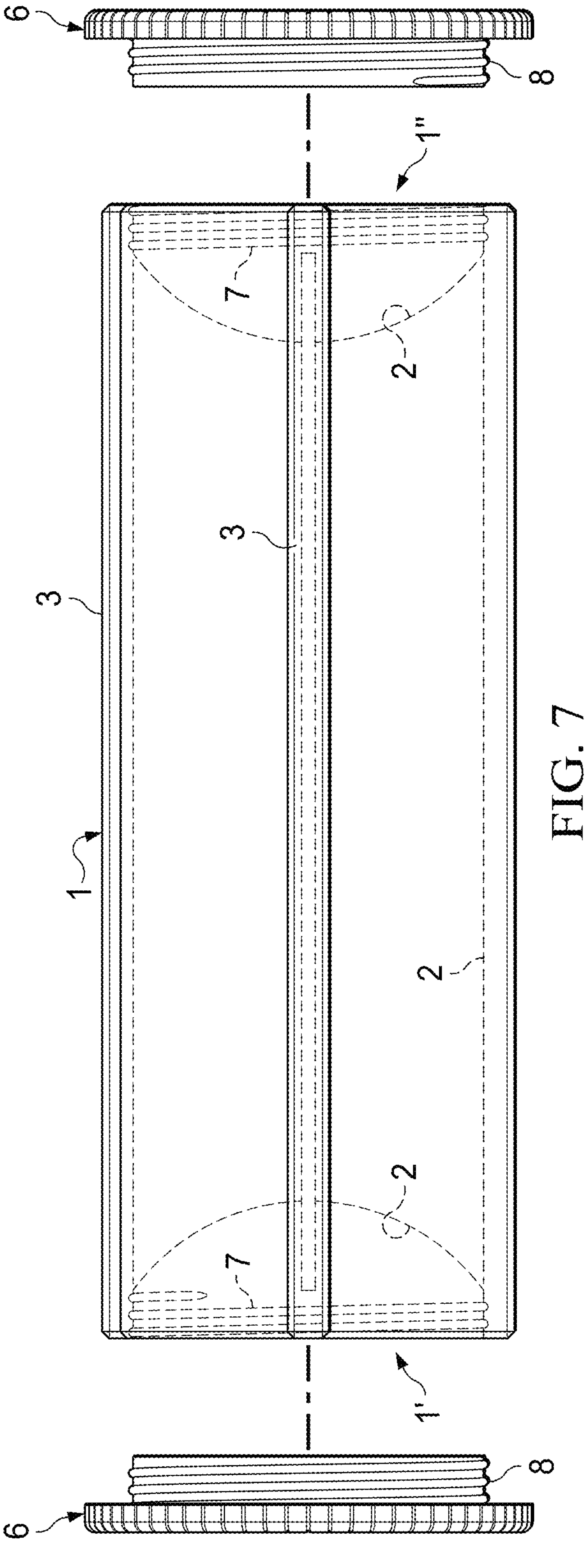
FIG. 7 is a side, exploded view of the cylindrical roller core and externally threaded, hollow retainer caps of the segmented massage roller of the present invention.
Figure 8:
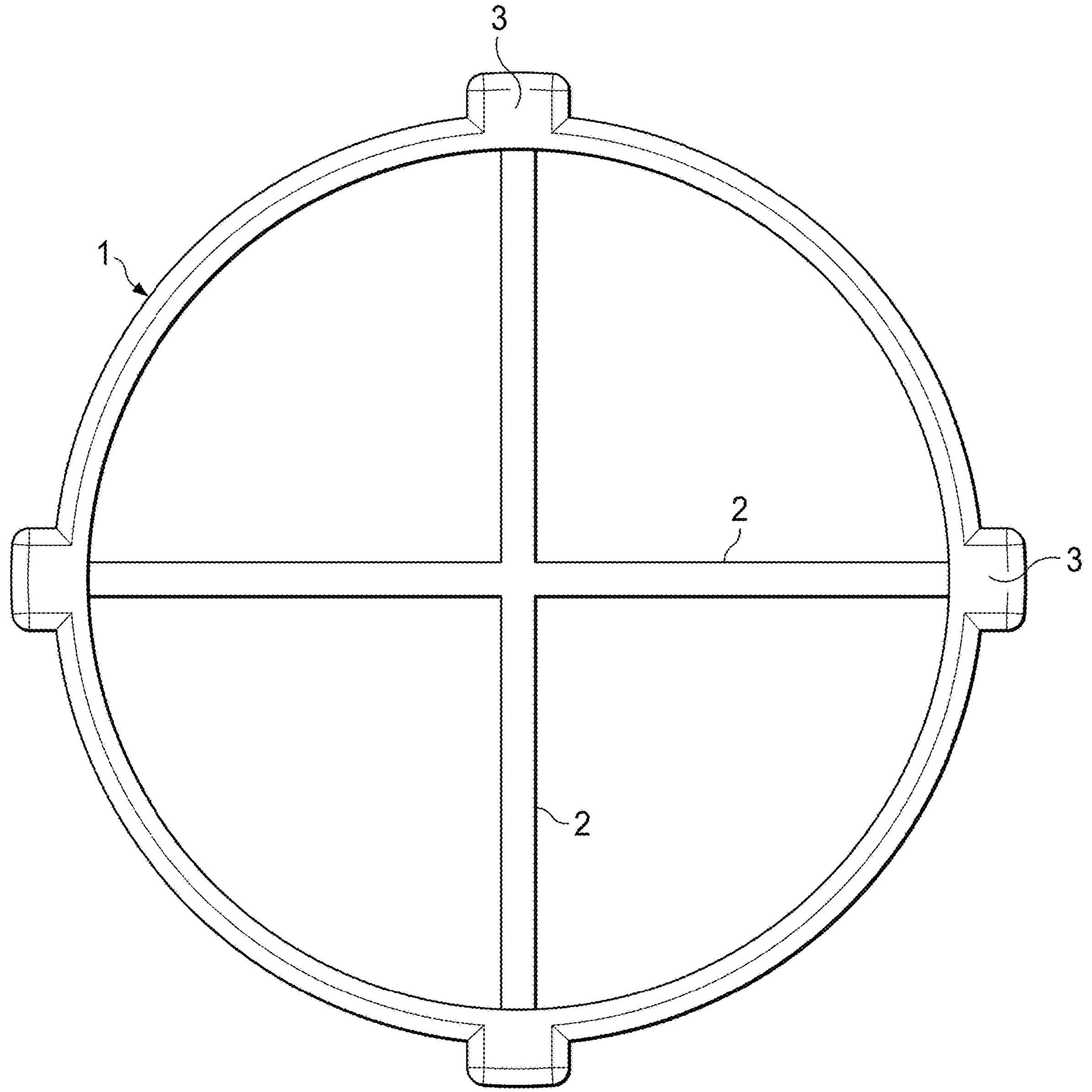
FIG. 8 is a front view of the cylindrical roller core of the segmented massage roller of the present invention.

As mentioned above, the cylindrical roller core 1 is further comprised of a plurality of interior structural supports 2 provided to offer greater support for the segmented massage roller 10 while in use. The cylindrical roller core 1 in combination with the interior structural supports 2 is referred to by Applicant as the UltraFin® core. The business entity of Applicants, GoFit, L.L.C., to which the rights of this patent application will eventually be assigned, owns all rights and title to U.S. Pat. No. 6,644,676 for the UltraFin® standard character mark. The cylindrical roller core 1 is also sometimes generally referred to as a finned roller core or X-core design. In a preferred embodiment, the ends of the interior structural supports 2 are concave as depicted in the figures, specifically FIGS. 1, 2, 7 and 10, and extend longitudinally throughout the interior of the core ending at the internal threads 7, which is depicted in more detail in FIGS. 2, 7 and 10. As previously mentioned, the cylindrical roller core 1 is further comprised of a plurality of exterior ribs 3, which will be further disclosed in more detail herein, running the length of the cylindrical roller core 1. As will be detailed further below, the core 1 is also further comprised of internal threads 7 at each end of the core. The cylindrical roller core 1 may be made from a molded hard plastic, such as PVC (polyvinylchloride), PPE (polyphenylene), or aluminum, molded or extruded foam, or other suitable rigid material. In a preferred embodiment, the length of the cylindrical roller core is 13" with a diameter of 4.375". However, it is within the ambits of the present invention to use any length and diameter for the core that would provide a user with the intended massage roller experience. Further, in another embodiment of the present invention, the cylindrical roller core 1 may be hollow from end to end and not include the interior structural supports 2 or partially hollow throughout the core.

Figure 4A:
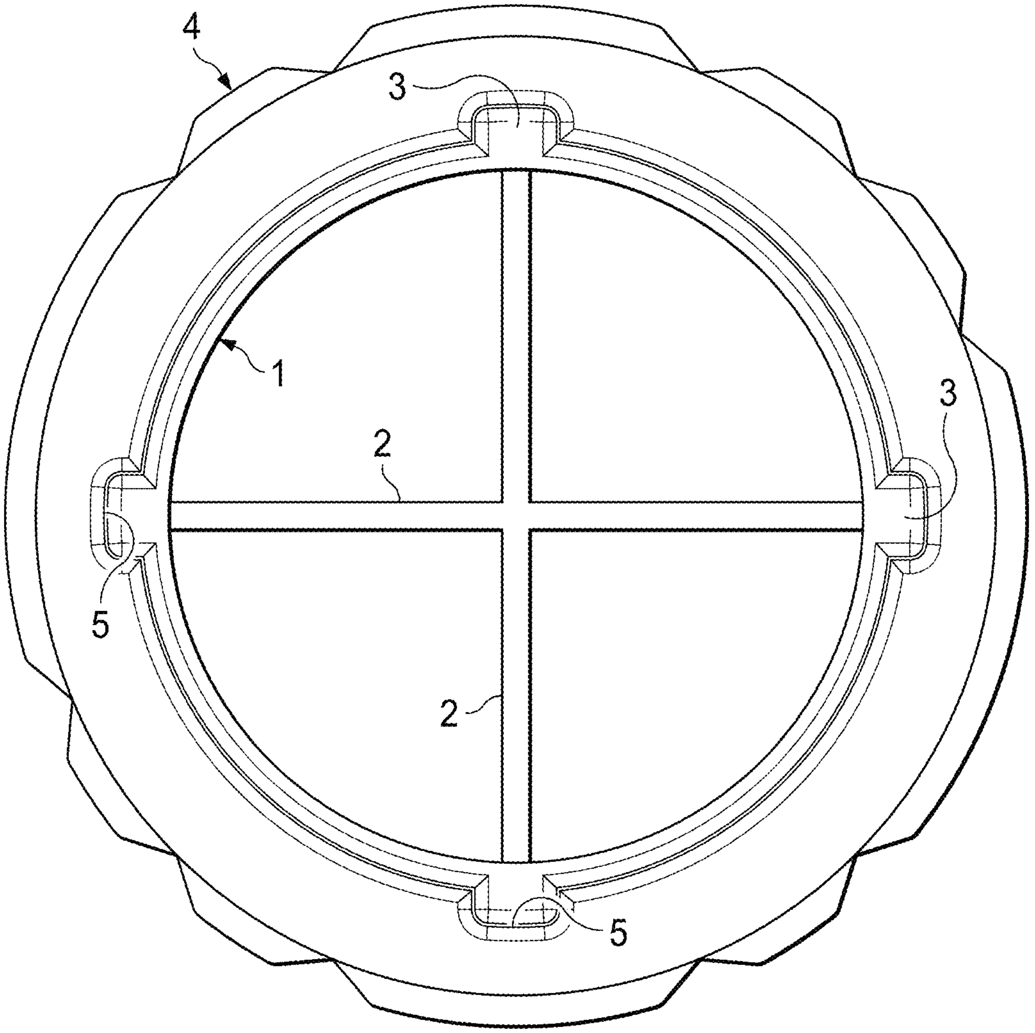
FIG. 4A is a front view of the low-profile/small size foam massage ring on the cylindrical roller core of the segmented massage roller of the present invention.
Figure 4B:
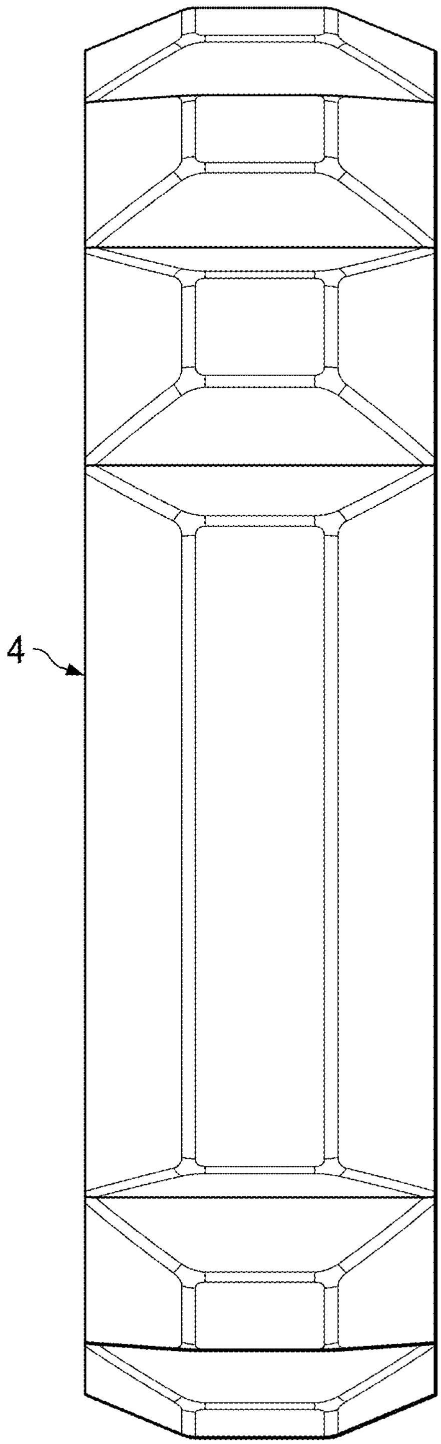
FIG. 4B is a side view of the low-profile/small size foam massage ring on the cylindrical roller core of the segmented massage roller of the present invention.
Figure 5A:
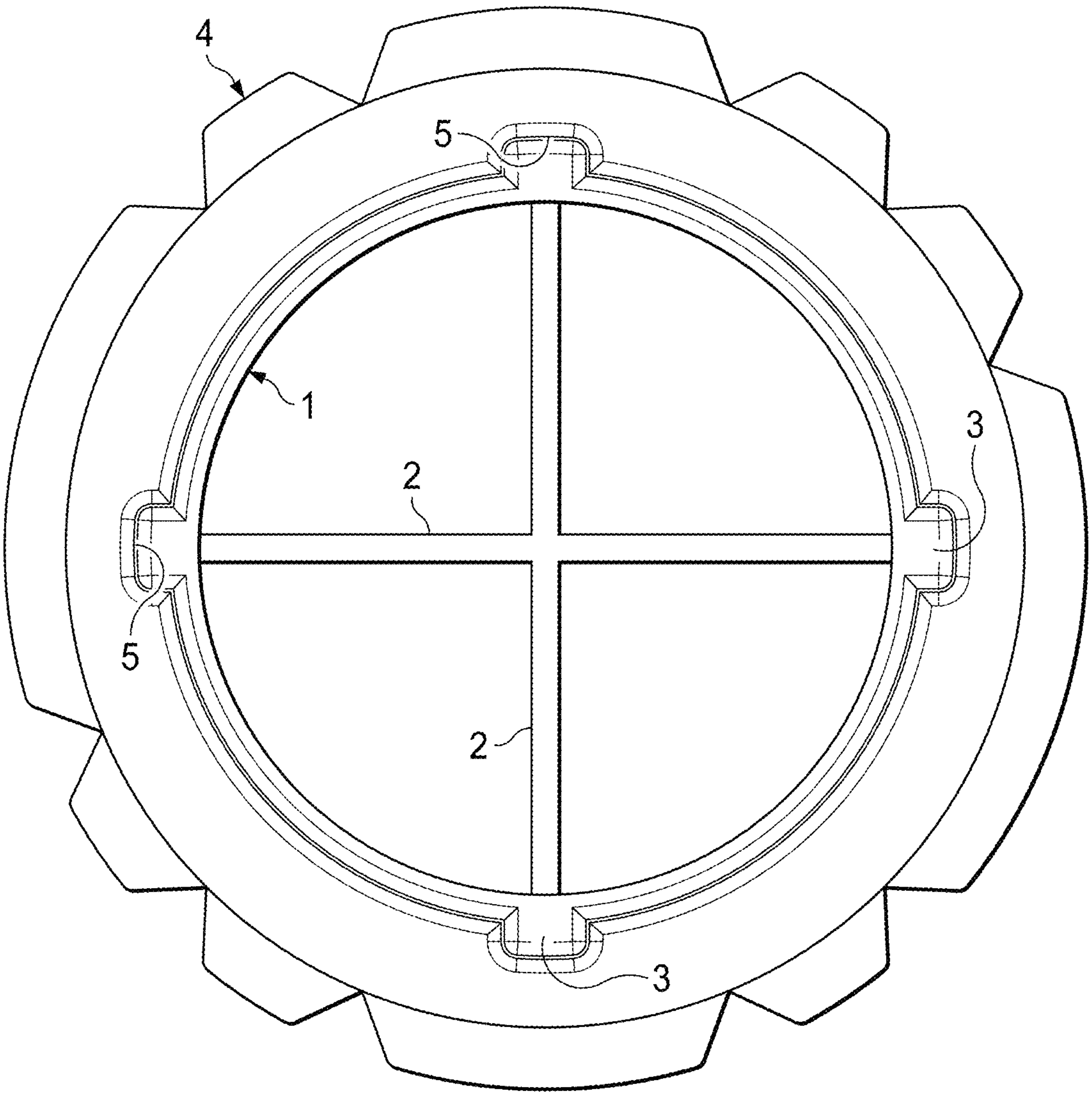
FIG. 5A is a front view of the medium-profile/medium size foam massage ring on the cylindrical roller core of the segmented massage roller of the present invention.
Figure 5B:
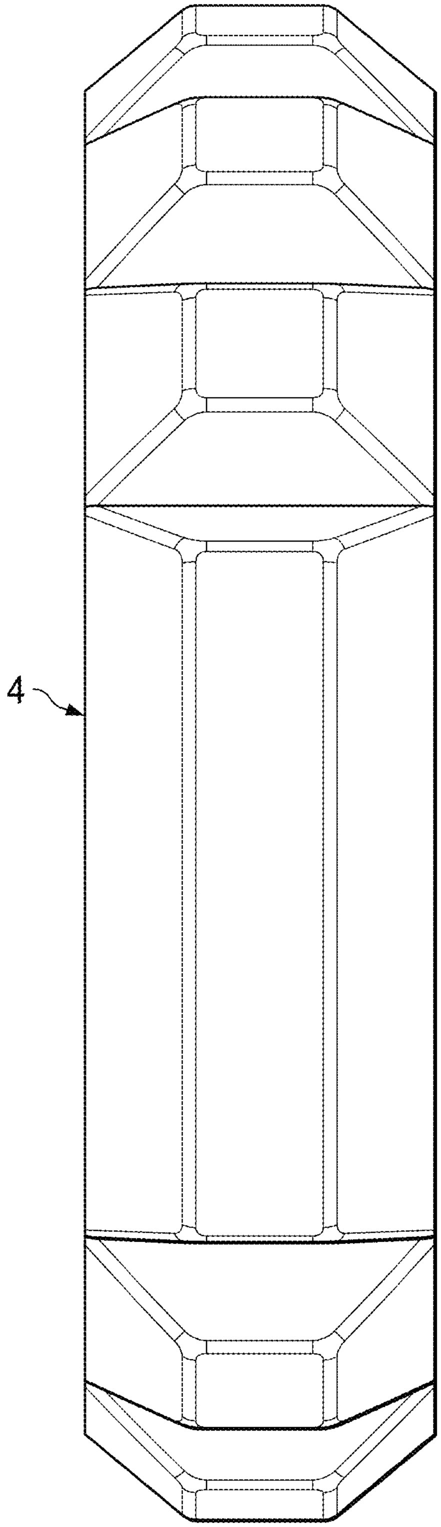
FIG. 5B is a side view of the medium-profile/medium size foam massage ring on the cylindrical roller core of the segmented massage roller of the present invention.
Figure 6A:
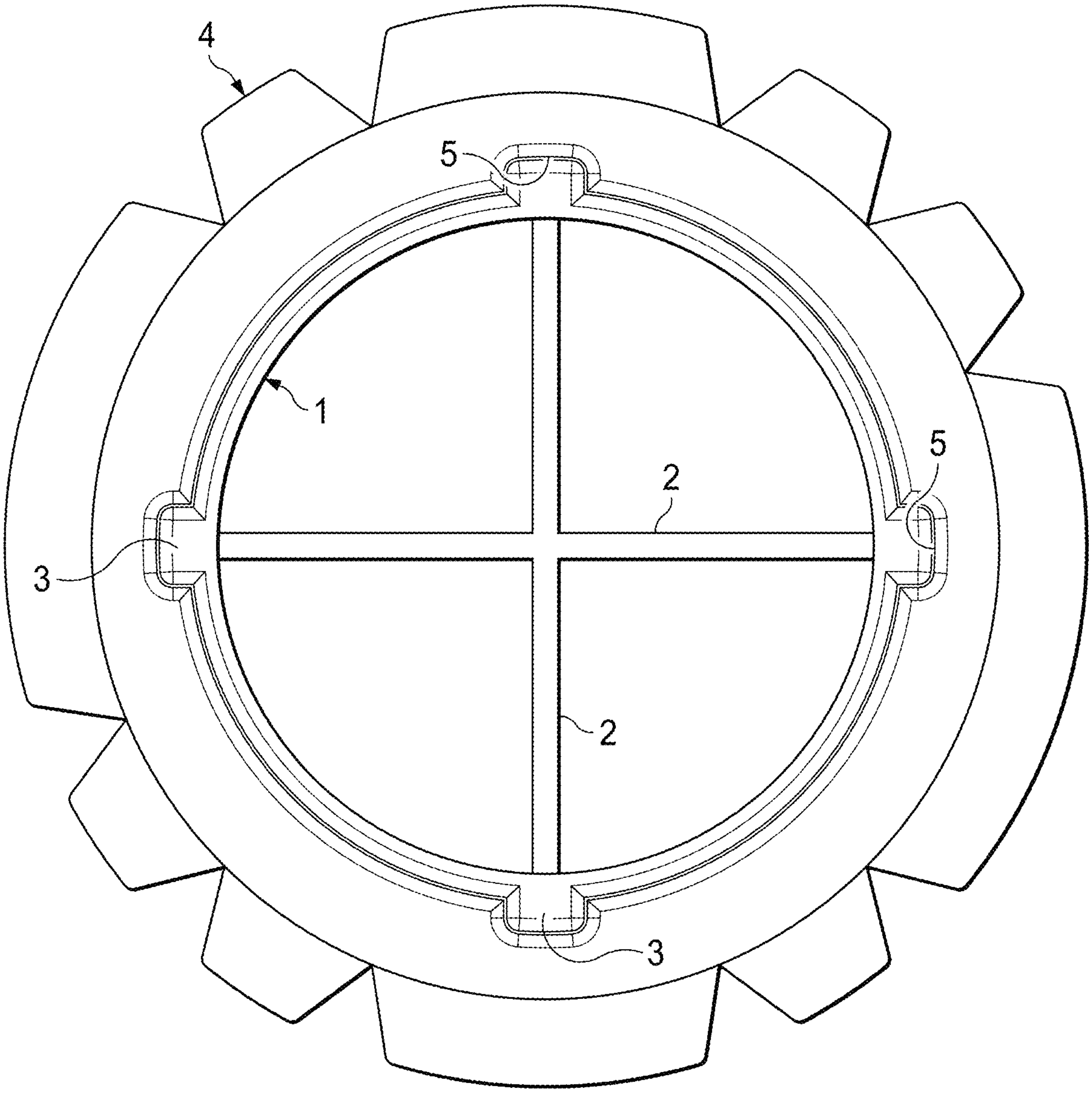
FIG. 6A is a front view of the high-profile/large size foam massage ring on the cylindrical roller core of the segmented massage roller of the present invention.
Figure 6B:
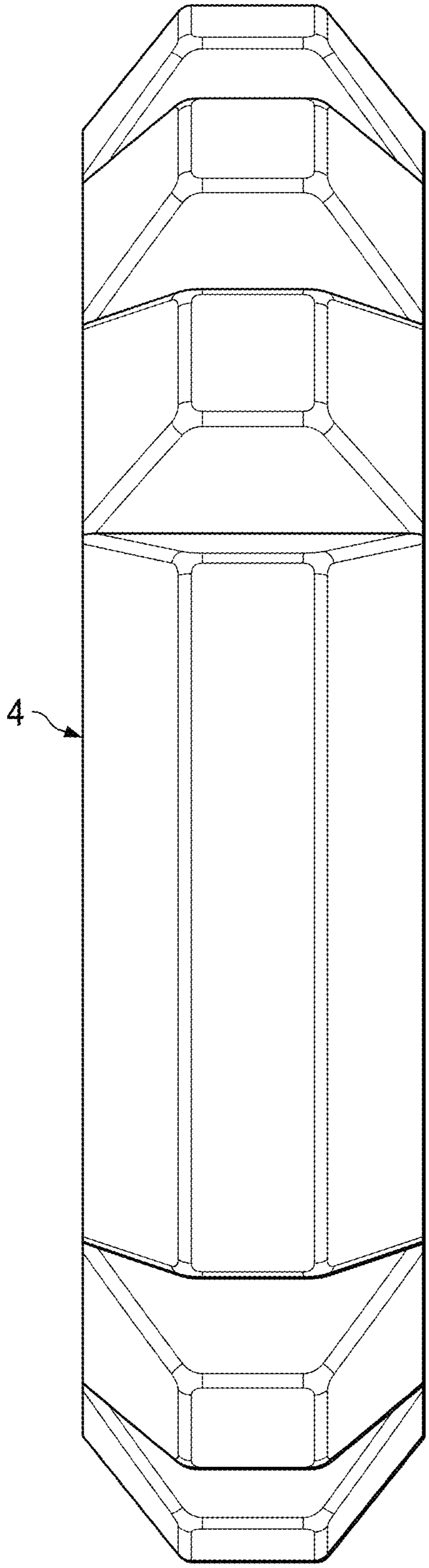
FIG. 6B is a side view of the high-profile/large size foam massage ring on the cylindrical roller core of the segmented massage roller of the present invention.

As previously mentioned, the segmented massage roller 10 of the present invention is further comprised of a plurality of foam massage rings 4. While most of the figures herein depict said foam massage rings, focusing specifically on FIGS. 4A, 4B, 5A, 5B, and 6A, 6B will allow us to detail the characteristics of the foam massage rings 4 in a preferred embodiment of the present invention. In a preferred embodiment, the foam massage rings 4 are available in three different sizes with three different sets of characteristics, all three are interchangeable and customizable to be used however a user wishes to provide the user with a specific massage need from superficial to deep tissue compression. The different characteristics may include different foam densities, different massage patterns of raised ridges, and different heights (or depths) of the massage patterns of raised ridges. FIGS. 4A and 4B show the foam massage rings 4 in a low-profile or small size, with a shortest height (or depth) of the massage pattern. FIGS. 5A and 5B show the foam massage rings 4 in a medium-profile or medium size, with a medium height (or depth) of the massage pattern. FIGS. 6A and 6B show the foam massage rings 4 in a high-profile or large size with a tallest height (or depth) of the massage pattern. In a preferred embodiment of the segmented massage roller 10 of the present invention, the foam massage rings 4 have the following outside diameters, from low, medium, to high-profiles: 5.875", 6.25", and 6.625", respectively. The difference in the heights (or depths) of the massage patterns and therefore outside diameters of the foam massage rings is simply due to there being more foam from size to size, as is depicted in the drawings. The foam massage rings 4 can be customized and interchanged on the cylindrical roller core 1 to create limitless massage configurations.

With a focus on FIGS. 2, 4A, 4B, 5A, 5B, 6A, 6B and 10, it is shown that the foam massage rings 4 are further comprised of a plurality of grooves 5 that are provided and adapted to slidably connect onto the ribs 3 of the core. In a preferred embodiment, the number of grooves 5 are equal to the number of ribs 3 of the core. In the illustrated embodiment in the figures, the number of grooves 5 and ribs 3 is four. This specific groove/channel and rib design allows for the foam massage rings 4 to slide easily onto the core and remain stabilized in place while the segmented massage roller 10 of the present invention is being used. The plurality of foam massage rings 4 are arguably the most important component of the present invention as they are what allow for the massage roller 10 to be adaptable and customizable based on a specific user's needs by interchanging the foam massage rings 4 or rotating the foam massage rings around the cylindrical roller core to be in any order or configuration to provide the desired massage relief A user can simply rotate the foam massage rings 4 one-quarter turn on the cylindrical roller core 1 to vary the massage pattern. Further, the plurality of foam massage rings 4 are what allow for the present invention to truly be a multi-density foam massage roller as each of the plurality of foam massage rings 4 has different characteristics, specifically the foam massage rings 4 each may have different foam densities, different massage relief patterns, and different heights (or depths) of the massage relief patterns.

Figure 11A:
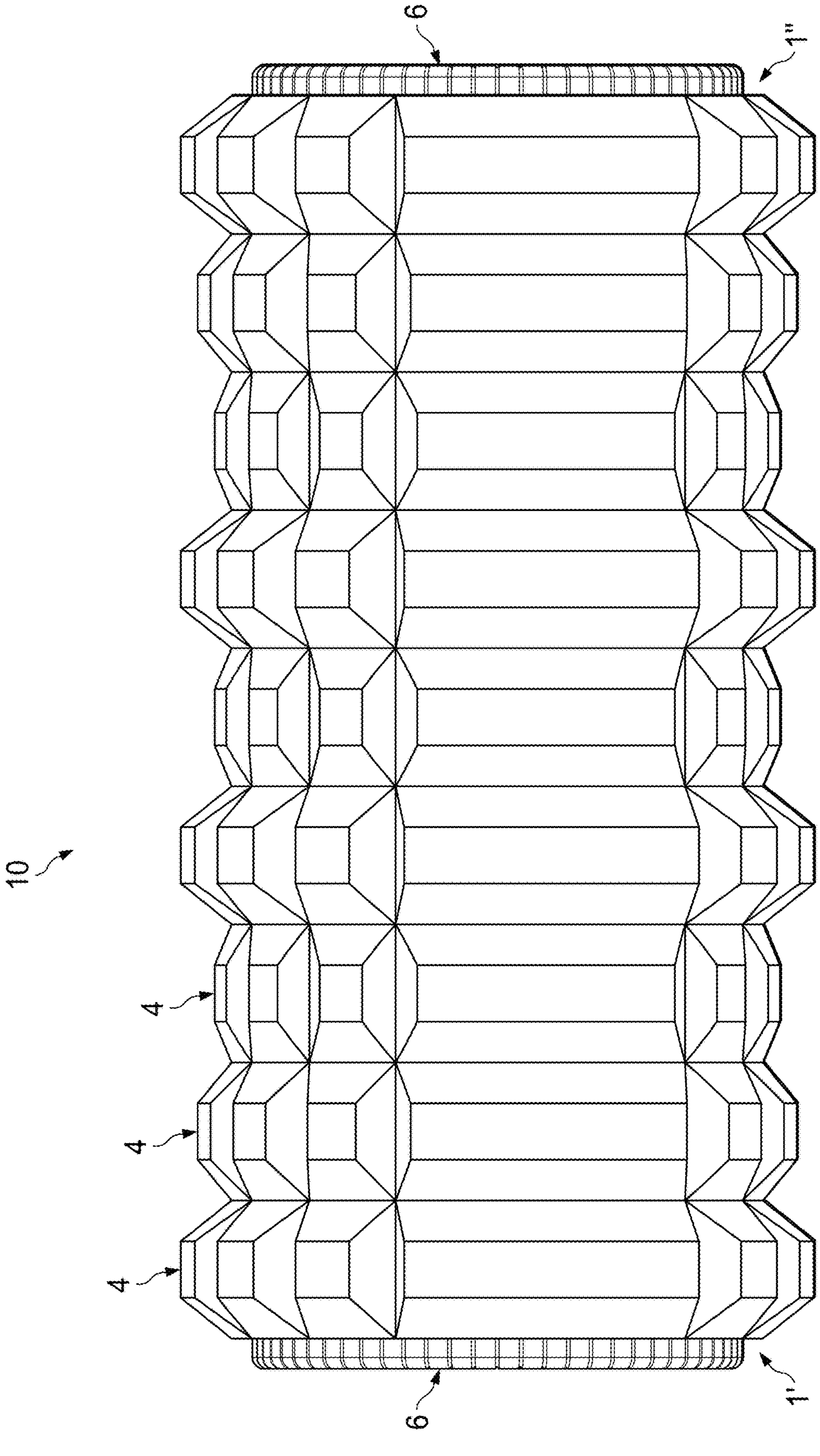
FIG. 11A is a side view of one embodiment of the segmented massage roller of present invention depicting a first way of arranging the foam massage rings when using three different foam massage ring sizes.
Figure 11B:
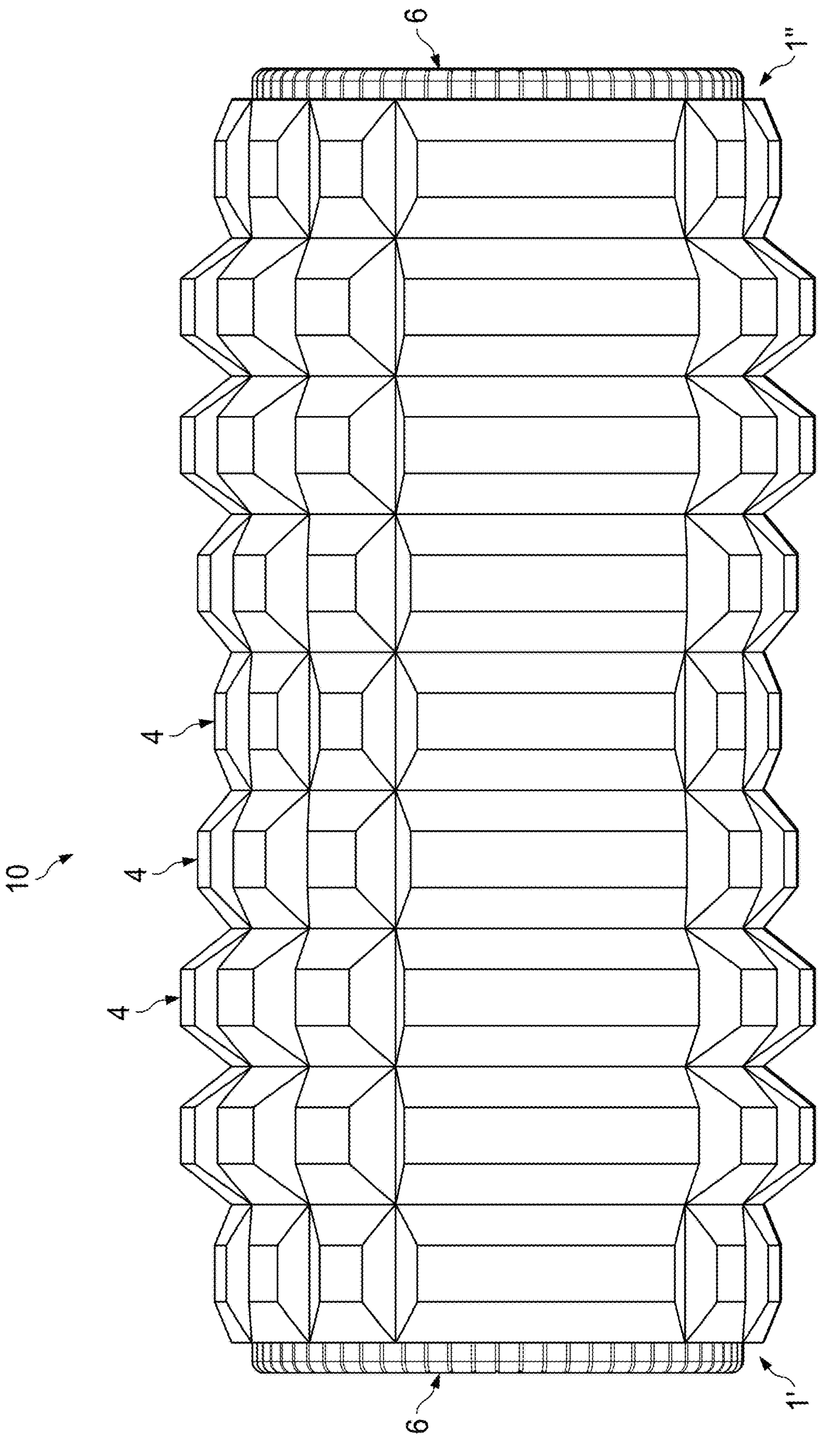
FIG. 11B is a side view of one embodiment of the segmented massage roller of present invention depicting a second way of arranging the foam massage rings when using three different foam massage ring sizes.
Figure 11C:
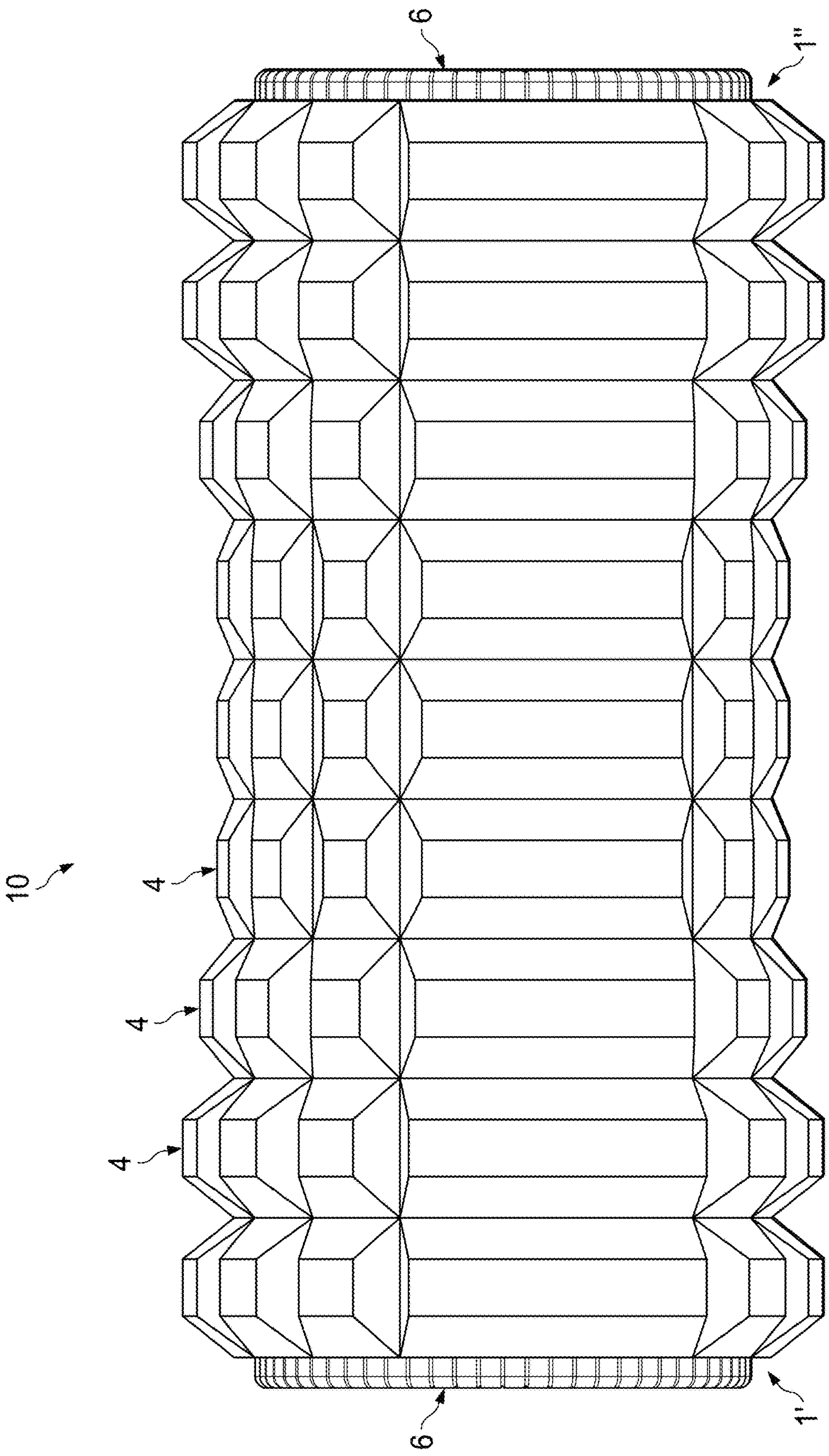
FIG. 11C is a side view of one embodiment of the segmented massage roller of present invention depicting a third way of arranging the foam massage rings when using three different foam massage ring sizes.

In a preferred embodiment of the present invention as detailed in the figures, specifically FIGS. 11A-11C, the segmented massage roller 10 is comprised of three (3) different foam massage rings 4, each of which have the different characteristics as described above. In this preferred embodiment and as detailed in the figures, the three foam massage rings 4 provided are as follows: 1) a low-profile massage wheel with soft-density foam; 2) a medium-profile massage wheel with mid-density foam; and 3) a high-profile massage wheel with firm-density foam. The terms “low-profile”, “medium-profile”, and “high-profile” specifically refer to the massage relief patterns and the height of the relief pattern projections, as specifically depicted in FIGS. 4A, 4B, 5A, 5B, and 6A, 6B. In FIGS. 11A-11C, three different, potential ways of arranging the various foam massage rings 4 is depicted. The different massage rings 4 can be differentiated by the different massage pattern heights or heights of the massage ridges.

Figure 12A:
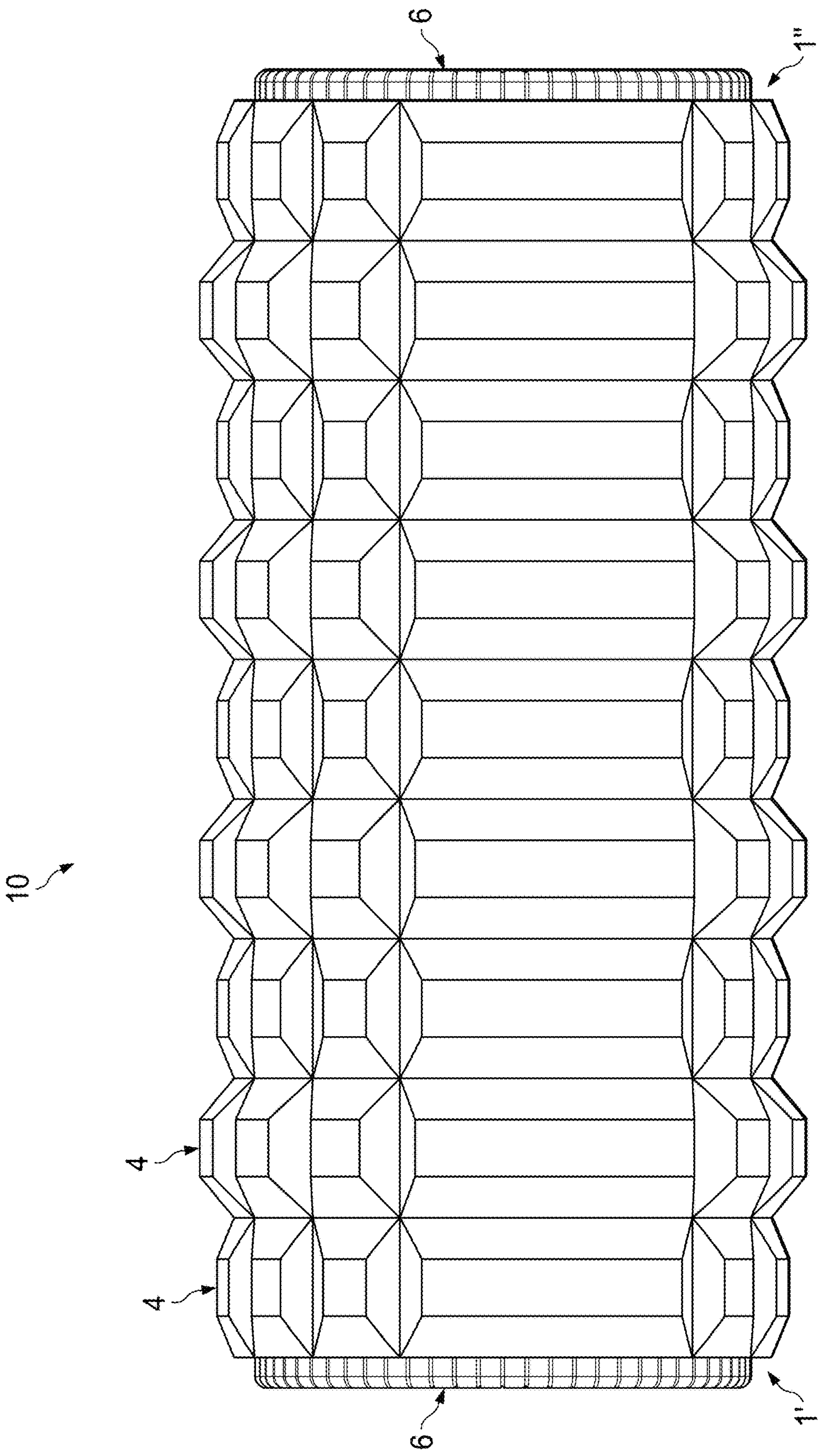
FIG. 12A is a side view of another embodiment of the segmented massage roller of present invention depicting a first way of arranging the foam massage rings when using two different foam massage ring sizes.
Figure 12B:
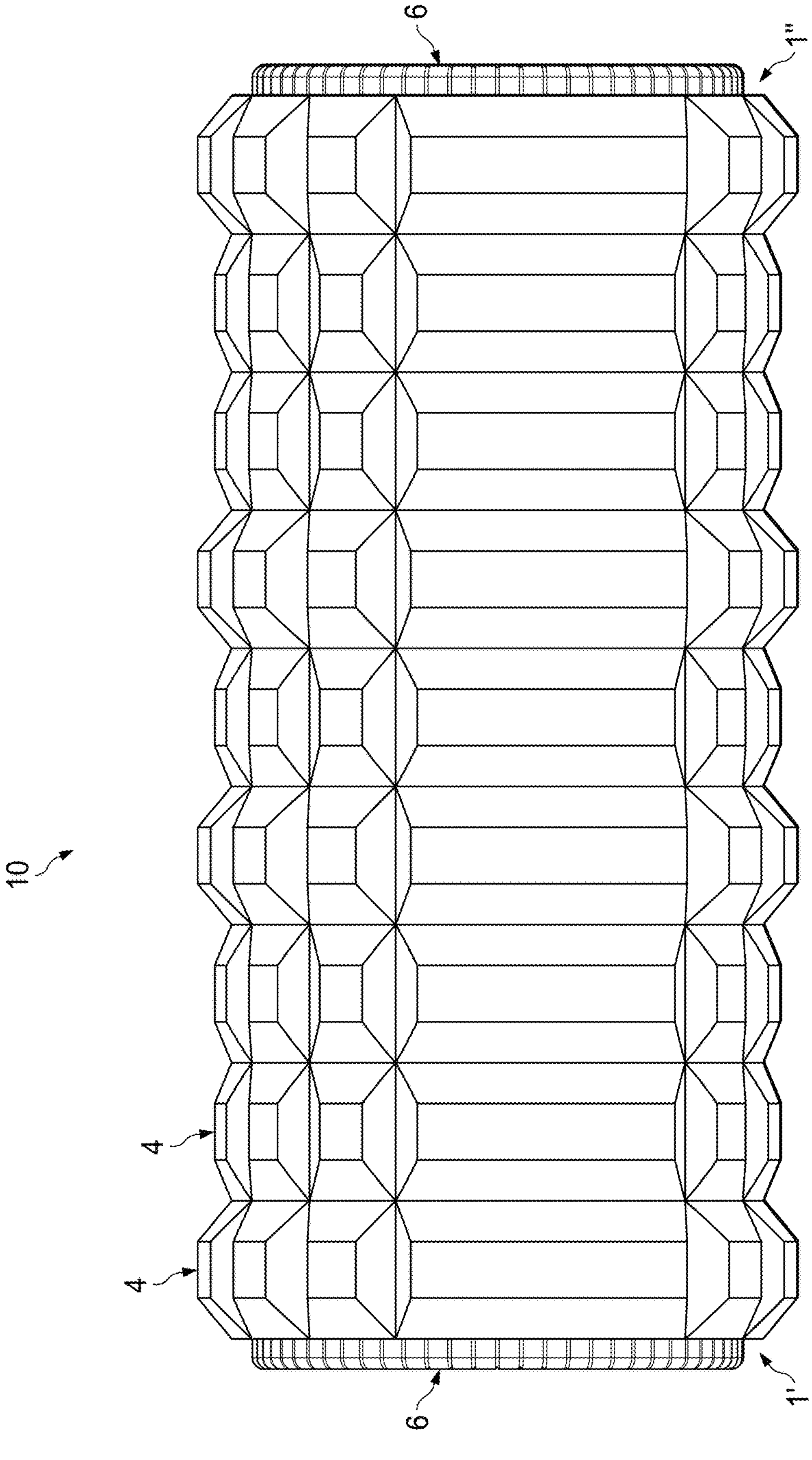
FIG. 12B is a side view of another embodiment of the segmented massage roller of present invention depicting a second way of arranging the foam massage rings when using two different foam massage ring sizes.
Figure 12C:
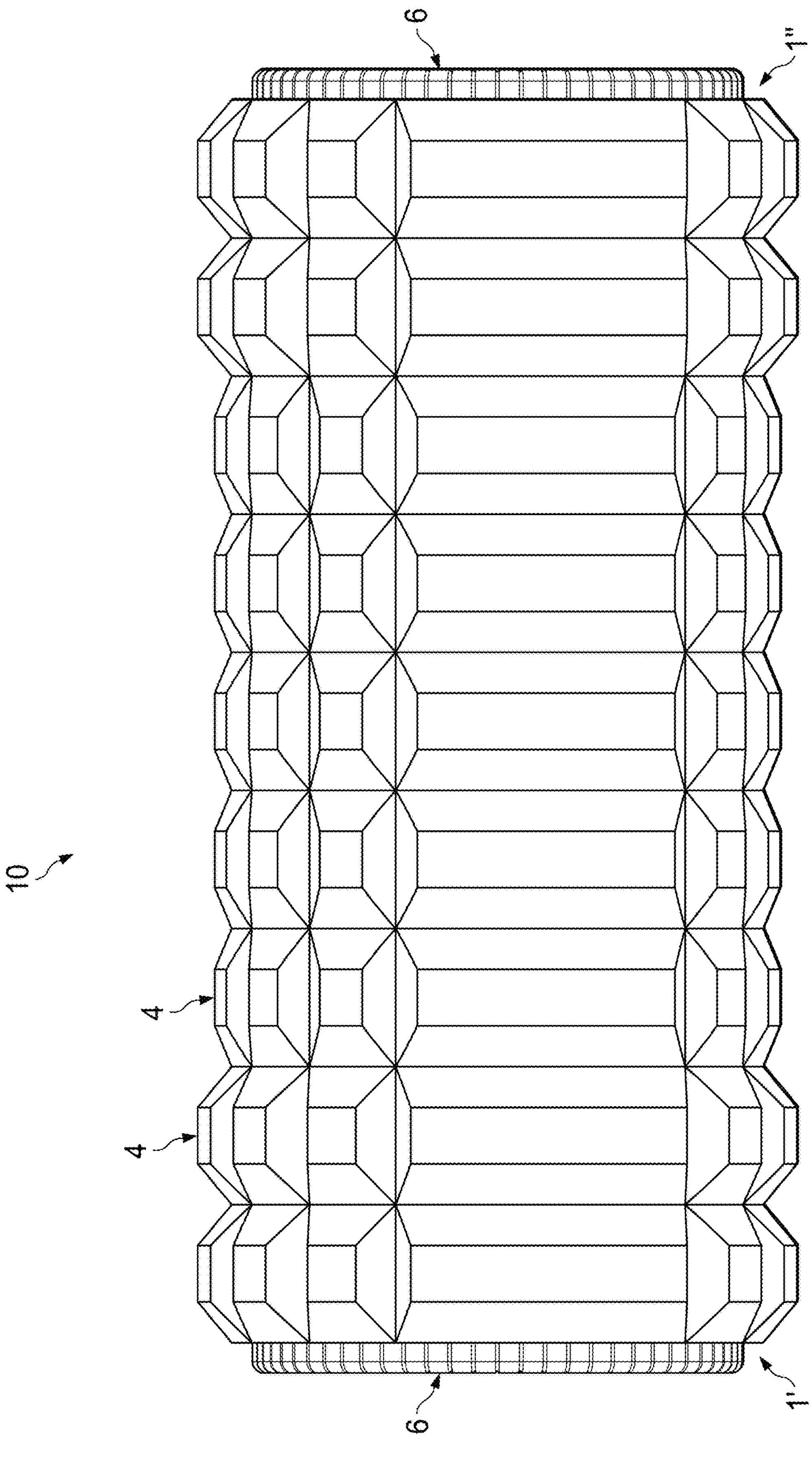
FIG. 12C is a side view of another embodiment of the segmented massage roller of present invention depicting a third way of arranging the foam massage rings when using two different foam massage ring sizes.

In another preferred embodiment as shown in FIGS. 12A-12B, it is shown three different ways to arrange the various massage rings 4 when only using two different foam massage rings. The different massage rings 4 can be differentiated by the different massage pattern heights or heights of the massage ridges. While the referenced preferred embodiments detailed in the figures are comprised of two and three foam massage rings, any number of foam massage rings with different characteristics, such as different foam densities, different massage relief patterns, and different heights of the relief pattern projections may be provided under the present invention. While certain dimensions and measurements for the various components for a preferred embodiment of the present invention have been mentioned herein, it is within the ambits of the present invention to use any different dimensions for any of the components. The foam massage rings of the present invention may be made from any type of open cell or closed cell foam, synthetic rubber, polyurethane or other resilient, pliable, flexible materials having the suitable and proper characteristics for the present invention.

Figure 9:
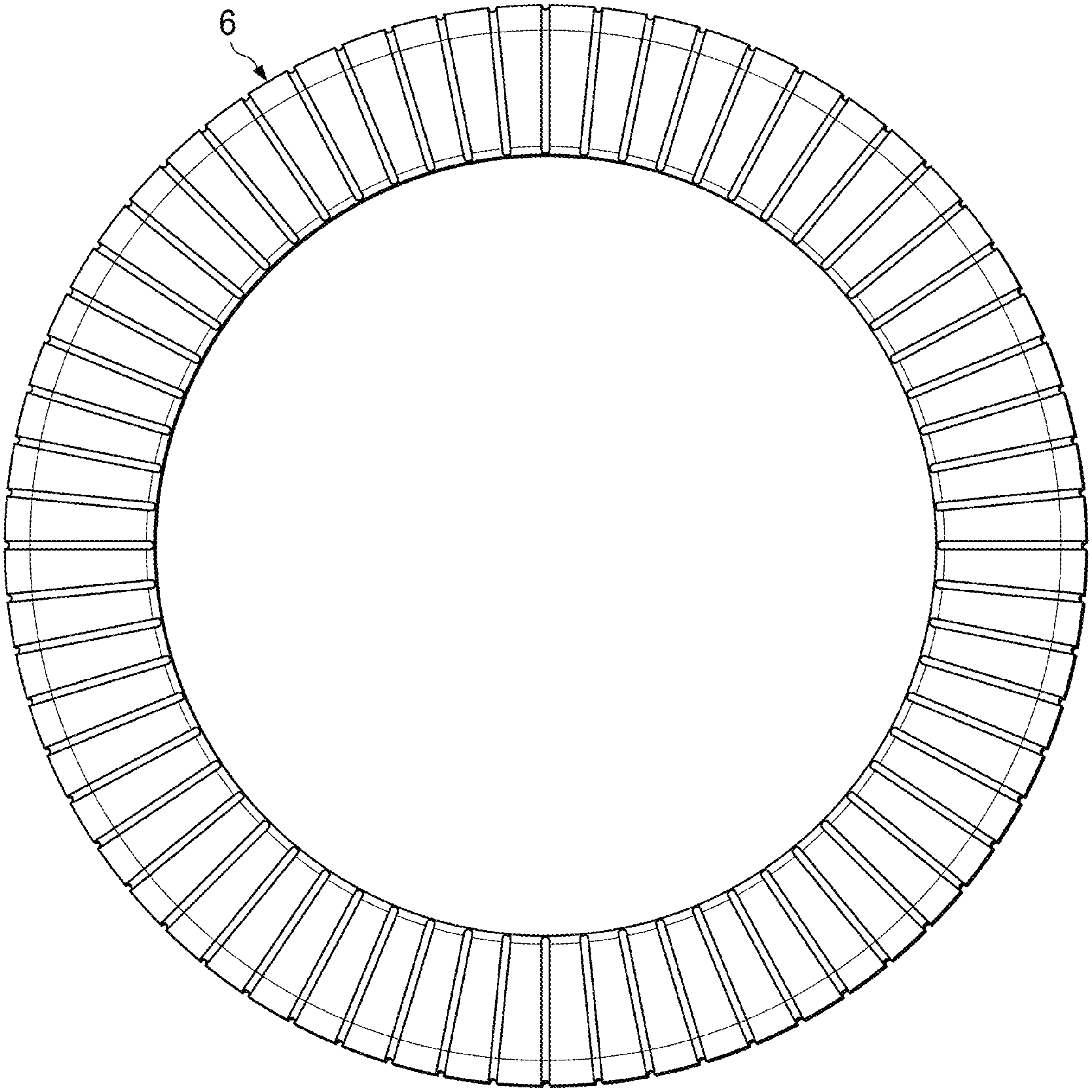
FIG. 9 is a front view of the externally threaded, hollow retainer caps of the segmented massage roller of the present invention.
Figure 10:
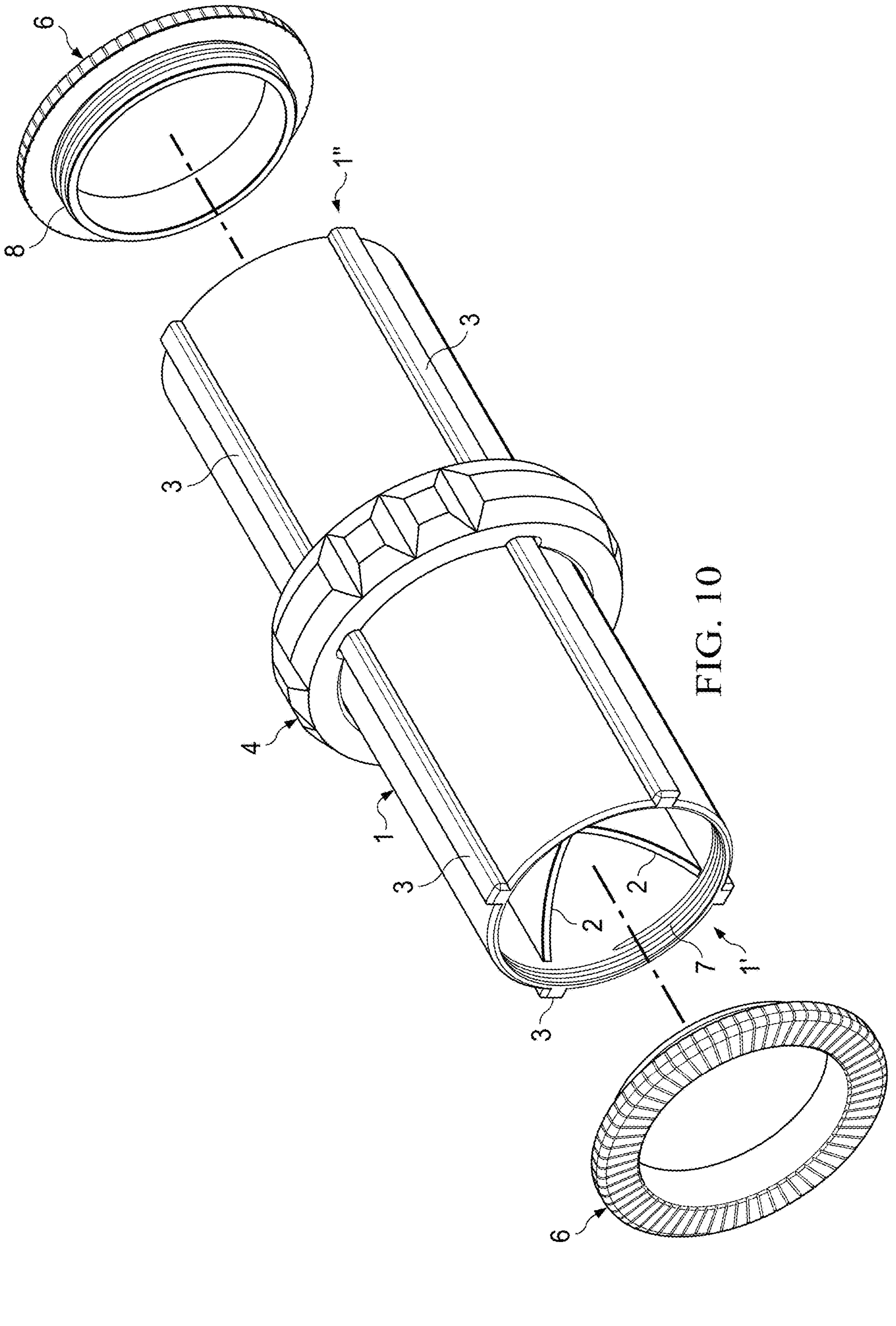
FIG. 10 is a perspective, exploded view of the cylindrical roller core with one massage ring on the cylindrical roller core, and the externally threaded, hollow retainer caps of the segmented massage roller of the present invention.

Further, as previously mentioned, and as specifically detailed in FIGS. 9 and 10, the improved segmented massage roller 10 of the present invention is further comprised of two externally threaded, hollow retainer caps 6 sometimes also be referred to as "end caps" or "threaded hollow end caps" or "threaded end caps" but these terms all refer to the same components that screw into the first end 1' and second end 1" of the cylindrical roller core 1 thereby securing the foam massage rings 4 on the core 1 so that it is ready to be used, in whatever arrangement the user desires. The externally threaded, hollow retainer caps 6 are comprised of external threads 8 that are adapted to mate to the ends of the cylindrical roller core 1, wherein said core comprises internal threads 7 at each end that are adapted to accept/mate with the external threads 78 of the externally threaded, hollow retainer caps 6. As mentioned above, once a user has arranged the foam massage rings 4 into their desired configuration on the cylindrical roller core 1, the user merely secures the foam massage rings 4 in such configuration to the core 1 by screwing the externally threaded, hollow retainer caps 6 into each end of the core 1. When the user is ready to customize the massage roller in a different manner, the user simply unscrews the externally threaded, hollow retainer caps 6 from the core 1 and interchanges the massage rings 4 in a different configuration as desired and then screws the externally threaded, hollow retainer caps 6 back into the core. The different configuration can be achieved by merely rotating the massage rings 4 around the core, specifically onto the ribs 3 to create a different massage relief pattern, by rearranging and/or putting different massage rings 4 on the core, or by doing a combination of both. There are numerous different configurations that a user can achieve with the current invention by using whatever massage rings 4 they prefer, in whatever order, arrangement, or configuration they prefer. The options and therefore potential massage relief patterns are truly limitless as a user can choose to use all of the same massage rings or any combination of the different massage rings and can arrange them in any configuration they prefer, including the order in which the massage rings are put on to the roller core as well as rotating the massage rings around the roller core.

While the above description of a preferred embodiment (or various embodiments) is deemed sufficient to permit those skilled in the art to practice the concepts of the present invention, it is to be appreciated that the invention may be embodied otherwise than is herein specifically shown and described and that, within said embodiment, certain changes may be made in the form and arrangement of the parts without departing from the underlying ideas or principles. Further, it is within the ambit of the present invention to cover any obvious modifications of the preferred embodiment described herein. It is intended that the present disclosure not be considered limiting and that the following claims be interpreted as covering all embodiments that fall within the true meaning and scope of the present invention.

What is claimed is:

1. A multi-density, customizable segmented massage roller comprising:

a cylindrical roller core having a first end and a second end, wherein the first end and the second end are internally threaded, and wherein the cylindrical roller core further comprises a plurality of interior structural supports running longitudinally from the internal threads of the first end to the internal threads of the second end, creating a plurality of interior cavities, and a plurality of exterior ribs running longitudinally from the first end to the second end of the cylindrical roller core;

a plurality of foam massage rings comprised of a plurality of interior grooves, wherein said plurality of interior grooves slidably connect to said plurality of exterior ribs of the cylindrical roller core, thereby securing the foam massage rings in a specific position on the cylindrical roller core; and two externally threaded, hollow retainer caps connected to the internally threaded first end and second end of the cylindrical roller core, thereby securing the foam massage rings onto the cylindrical roller core;

wherein the plurality of foam massage rings are further comprised of a plurality of: different densities, different massage patterns, and different massage pattern heights.

2. The segmented massage roller of claim 1, wherein the plurality of foam massage rings can be arranged in any order based on the plurality of different densities, different exterior massage patterns, and different massage pattern heights.

3. The segmented massage roller of claim 1, wherein the plurality of interior grooves and the plurality of exterior ribs is equal to four each.

4. A multi-density, customizable segmented massage roller comprising:

a cylindrical roller core;

a plurality of foam massage rings;

two externally threaded, hollow retainer caps;

wherein the cylindrical roller core is comprised of a first end and a second end;

wherein said first end and second end of the cylindrical roller core are internally threaded;

wherein the cylindrical roller core is further comprised of a plurality of interior structural supports running longitudinally from the internal threads of the first end to the internal threads of the second end creating a plurality of interior cavities, and a plurality of exterior ribs running longitudinally from the first end to the second end of the cylindrical roller core;

wherein the plurality of foam massage rings are further comprised of a plurality of interior grooves and a plurality of exterior massage patterns;

wherein said plurality of interior grooves of the foam massage rings slidably connect to said plurality of exterior ribs of the cylindrical roller core, thereby securing the foam massage rings in a specific position on the cylindrical roller core;

wherein the two externally threaded retainer caps are connected to the internally threaded first end and second end of the cylindrical roller core, thereby securing the foam massage rings onto the cylindrical roller core;

wherein the plurality of foam massage rings are comprised of a plurality of: different densities, different exterior massage patterns, and different massage pattern heights; and wherein the plurality of foam massage rings can be arranged in any order based on the plurality of different densities, different exterior massage patterns, and different massage pattern heights.

5. The segmented massage roller of claim 4, wherein the plurality of interior grooves and the plurality of exterior ribs is equal to four each.

* * * * *